United States Patent [19]

Carter

[11] Patent Number: 5,556,107

[45] Date of Patent: Sep. 17, 1996

[54] COMPUTER GAME APPARATUS FOR PROVIDING INDEPENDENT AUDIO IN MULTIPLE PLAYER GAME SYSTEMS

[75] Inventor: Andrew L. Carter, Saratoga, Calif.

[73] Assignee: Apple Computer, Inc., Cupertino, Calif.

[21] Appl. No.: 490,549

[22] Filed: Jun. 15, 1995

[51] Int. Cl.⁶ .................................................... A63F 9/22
[52] U.S. Cl. ............................................. 463/35; 463/36
[58] Field of Search ................................... 273/434, 433, 273/85 CP, 85 G, DIG. 28, 148 B; 364/410; 381/17

[56] References Cited

U.S. PATENT DOCUMENTS

| | | | |
|---|---|---|---|
| 4,281,833 | 8/1981 | Sandler et al. | 273/85 G |
| 5,026,051 | 6/1991 | Lowe et al. | 273/85 G X |
| 5,052,685 | 10/1991 | Lowe et al. | 273/DIG. 28 |
| 5,095,798 | 3/1992 | Okada et al. | 381/17 X |
| 5,138,660 | 8/1992 | Lowe et al. | 381/17 |
| 5,149,104 | 9/1992 | Edelstein | 273/434 |
| 5,390,938 | 2/1995 | Takeya | 273/434 |
| 5,393,072 | 2/1995 | Best | 273/434 |

FOREIGN PATENT DOCUMENTS

| | | | |
|---|---|---|---|
| 6079060 | 3/1994 | Japan | 273/433 |
| 6198074 | 7/1994 | Japan | 273/434 |
| 6238062 | 8/1994 | Japan | 273/433 |
| 6285258 | 10/1994 | Japan | 273/434 |

*Primary Examiner*—V. Millin
*Assistant Examiner*—Michael O'Neill
*Attorney, Agent, or Firm*—Irell & Manella LLP

[57] ABSTRACT

The present invention has application to dedicated multimedia game systems and computer game programs executed by personal computers. A central processing unit (CPU) is coupled to a mass storage device, such as for example, a read-only memory game cartridge, CD-ROM, floppy disk or hard disk drive. The mass storage device stores an application game program which is executed by the CPU and further stores a library of sound data. A sound synthesizer circuit is coupled to the CPU for generating digital audio signals from the sound data stored in said mass storage device. Under program control the CPU selectively provides sound data for a player of the game program to the sound synthesizer circuit. A digital to audio converter (DAC) is coupled to receive the digital audio signals from the sound synthesizer circuit and convert the digital audio signals into analog audio signals. A listening device, such as a headphone, is coupled to the DAC to covert the analog audio signals into sound waves to be heard by the player. Under program control the CPU directs certain of the sound data to each of the players, such that the players hear separate and independent audio as required by the game program.

15 Claims, 4 Drawing Sheets

COMPUTER GAME APPARATUS FOR PROVIDING INDEPENDENT AUDIO IN MULTIPLE PLAYER GAME SYSTEMS

FIELD OF THE INVENTION

The present invention relates to the field of multimedia game systems, and more particularly, to audio systems used in both dedicated multimedia game devices and personal computers.

ART BACKGROUND

Historically, multimedia game systems utilized two dimensional landscapes and iconic bit mapped action characters. Game players viewed this two dimensional world through a low resolution cathode ray tube (CRT) which typically comprised a home television set. Software content was limited by low resolution graphics, low processor speeds, and in some instances, monaural audio provided to the game players.

Recent innovations to both home cartridge-based game systems and game programs executed by personal computers (PCs) have changed many of the systems' characteristics. Today, richly-textured, three dimensional graphics supported by hardware chip sets supplement or replace older bit mapped two dimensional graphics. CD-ROM players have expanded storage capacity and the addition of modems for network game playing expands the number and geographical sphere of players. These recent innovations have effectively eliminated the traditional boundaries between games viewed on televisions and those viewed on personal computers.

However, although the sophistication of game programs and the displayed graphics have markedly improved from earlier generations of cartridge and PC-based systems, audio quality has generally lagged. More particularly, prior art monaural or dedicated game devices and personal computer systems typically provide a single monaural or stereo output to all of the players of the game simultaneously. Thus, each of the players of a multimedia game perceive the same audio experience. Although the audio may be stereophonic, it does not vary between the players.

As will be described, the present invention provides an enhanced audio experience for each of the players of a multimedia game heretofore unknown in the prior art. By providing separate and independent audio to each of the players of either a dedicated game machine or personal computer, the game experience is enhanced and tailored to the particular player. The present invention permits separate and independent audio to be perceived by each player, or groups of players, which may be a function of the game, of the players' language, the players' ability to handle more complex audio feedback, and/or the players' technical understanding.

SUMMARY OF THE INVENTION

The present invention has application to dedicated multimedia game systems and computer game programs executed by personal computers. A central processing unit (CPU) is coupled to a mass storage device, such as for example, a read-only memory game cartridge, CD-ROM, floppy disk or hard disk drive. The mass storage device stores an application game program which is executed by the CPU and further stores a library of sound data. A sound synthesizer circuit is coupled to the CPU for generating digital audio signals from the sound data stored in said mass storage device. Under program control the CPU selectively provides sound data for a player of the game program to the sound synthesizer circuit. A digital to audio converter (DAC) is coupled to receive digital audio signals from the sound synthesizer circuit and convert the digital audio signals into analog audio signals. A listening device, such as a headphone, is coupled to the DAC to convert the analog audio signals into sound waves to be heard by the player. Under program control the CPU directs certain portions of the sound data to each of the players, such that the players hear separate and independent audio as required by the game program.

In a first embodiment, the DAC provides a stereo output having left and right channels. The CPU directs sound data for a first player to the left channel and sound data for a second player to the right channel. The two players each control separate game controllers and wear headphones coupled to the game controllers. The headphones for the first player are coupled to the left output channel of the DAC and the headphone for the second player are coupled to the right output of the DAC. Thus, each player hears a separate and independent monaural channel of audio.

In a second embodiment, the stereo output of the DAC is coupled to an analog multiplexer which is under the control of the CPU. A plurality of players operate game controllers which are coupled to the multiplexer. The CPU directs sound data destined for each player independent of sound data destined for other players. The CPU controls the multiplexer selection such that the appropriate game controller is selected to receive the desired audio at the appropriate time. As in the first embodiment, the player's headphones are coupled to the game controller such that the player hears audio intended for that player independent of the other players.

In a third embodiment, the sound synthesizer circuit is coupled to a sound bus. Separate DACs are provided for each hand controller and are coupled between the audio bus and the hand controllers. A DAC control bus is provided which is coupled to the CPU and enable circuits for each of the DACs. In operation, the CPU executing the game program provides sound data to the sound synthesizer circuit which provides its digital audio signal output to the audio bus. Each of the DACs are selectively enabled by a control signal coupled over the control bus by the CPU, such that substantially concurrent with the sound synthesizer circuit providing digital audio signals to the sound bus, the CPU enables the appropriate DAC corresponding to the desired destination game controller and headphone.

In a fourth embodiment, the sound synthesizer circuit is coupled to a digital input device controller which is in turn coupled to a bi-directional high speed digital bus. Each game controller is coupled to the bus and includes a microcontroller and interface logic to receive and send data over the bus. The microcontroller is coupled to a DAC to which a player's headphones are in turn coupled. In operation, a game program executed by the CPU utilizes sound data stored in the mass storage device. In accordance with program commands, the CPU forwards sound data to a particular game player operating one of a plurality of game controllers coupled to the bus. The sound synthesizer circuit converts the sound data into digital audio signals, which are encapsulated into packets by the digital input device controller in accordance with the particular protocol of the bus. The packet includes address information unique to the destination game controller. The packet is received by the destination game controller and decapsulated to recover the digital audio signals which are then coupled to the DAC. The DAC converts the digital audio signals into analog audio signals which are provided to the player's headphones.

DETAILED DESCRIPTION OF THE INVENTION

The present invention discloses methods and apparatus for providing separate and independent audio experiences to users of a multimedia game system. In the following description, numerous specific details are set forth, such as system architectures, representative devices, and exemplary hardware configurations, etc. to provide a thorough understanding of the present invention. However, it will be apparent to one skilled in the art that the present invention may be practiced without these specific details.

In other instances, well-known circuits and structures are not described in detail in order not to obscure the present invention unnecessarily. For example, since the present invention relates to the audio component of a multimedia game system, various video, control and other subsystems which are common to both dedicated multimedia game devices as well as personal computers are not shown in the figures or described. It will be appreciated by one skilled in the art that these additional subsystems for video, video compression, system integration and control may be necessary to integrate the present invention into a multimedia game system. Similarly, power, control and other lines and devices are not shown in the drawings, but their addition will be apparent to one skilled in the art based upon the description of the present invention in this Specification. Moreover, although the present invention is described with reference to a dedicated game device, it should be noted that the teachings of the present invention may be applied to personal or other general purpose digital computers which are configured by either hardware or software to run multimedia game applications. The description of the present invention in the context of a dedicated game device does not limit its application to its use in conjunction with more general purpose computers.

Figure 1:
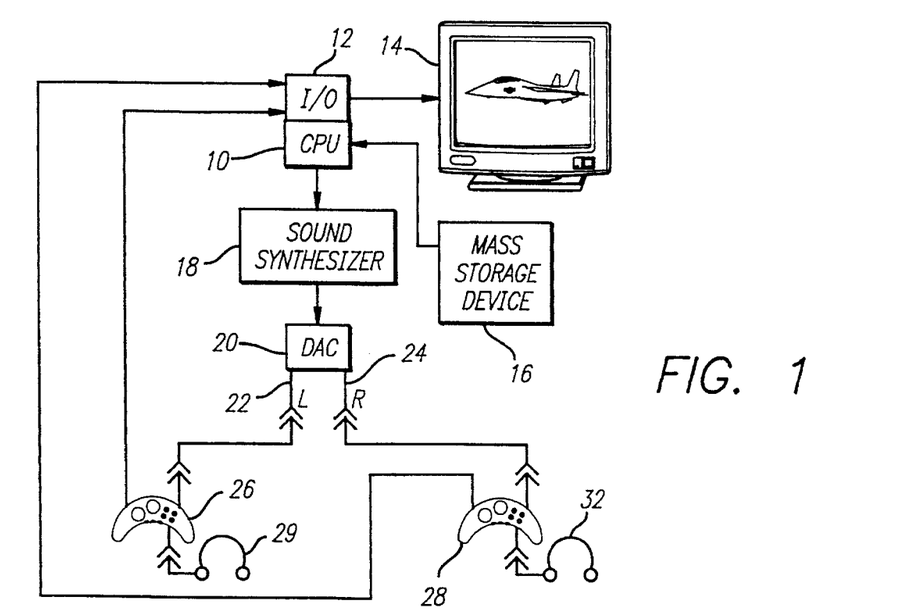
FIG. 1 is a block diagram illustrating a first embodiment of the present invention wherein monaural audio is provided to each game player.

Referring now to FIG. 1, a first embodiment of the present invention is illustrated. A central processing unit (CPU) 10 is coupled through supporting circuitry (not shown) to an input/output (I/O) circuit 12. The I/O circuit 12 is used to communicate information in appropriately structured form to I/O devices and to provide a video output to a display 14. Where the present invention is applied to a dedicated game device the display 14 will likely comprise a color television set. Where the present invention is applied to a personal computer, the display 14 may comprise a computer monitor. As shown, the visual output of an application program, such as for example, a multimedia game, an educational program or the like is displayed on the display 14. A mass data storage device 16 is coupled to the CPU 10. The mass data storage device 16 may comprise a hard disk drive, a read-only memory (ROM) game cartridge, a CD-ROM or other read-only or writable mass storage device. The mass storage device 16 stores the application game program which is executed by CPU 10. As such, the CPU 10 is under program control in accordance with the instructions stored in the mass storage device 16.

Mass storage device 16 further stores a library of sound data which is used by the particular multimedia game program executed by CPU 10. The sound data stored on the mass storage device 16 may comprise sound data, analog sound data, MIDI code sequences and the like. Therefore, it is contemplated that whatever form mass storage device 16 takes, the necessary application program, images, and sounds required by the particular multimedia game are stored therein and are accessible to the CPU 10. It will further be appreciated that in the embodiments disclosed in this Specification, that the application program, and/or the sound data, may be downloaded from a network for storage in the mass storage device 16 or for direct execution by the CPU 10.

As illustrated in FIG. 1, a sound synthesizer circuit 18 is coupled to, and under the control of, CPU 10. In practice, the sound synthesis circuit 18 may comprise digital hardware or be implemented in software to achieve substantially the same functionality. The sound synthesizer circuit generates the required audio output under the control of CPU 10 utilizing the sound data stored in the mass storage device 16. The output of the sound synthesizer circuit 18 is coupled to a digital to audio converter (DAC) 20, which receives the digital output of the sound synthesizer circuit 18 and converts the digital audio data into analog electrical signals.

As shown in FIG. 1, the output of the DAC 20 comprises left (L) output 22 and right (R) output 24. In prior art systems, the left 22 and right 24 outputs comprise a stereo audio output which was perceived by all players of the multimedia game. However, in accordance with the teachings of the present invention, the left 22 and right 24 outputs of the DAC 20 are coupled to separate game controllers 26 and 28, as shown in the figure. As is well-known, game controllers 26 and 28 are used by players of the multimedia game to interact with CPU 10 through the I/O circuit 12. Depending on the particular game application program executed by CPU 10, each of the respective players must provide appropriate inputs using game controllers 26 and 28, respectively, to play the game. As illustrated, a headphone 29 is coupled to the game controller 26, and a headphone 32 coupled to the game controller 28.

In accordance with the teachings of the present invention, rather than providing a stereophonic audio output to both players, this first embodiment provides independent audio outputs in monaural form to each of the respective players. Utilizing the teachings of the present invention, it is contemplated that the sound data stored in the mass storage device 16 will be selectively provided to each of the users by CPU 10 as required by the particular game program. Thus, the left and right channels output different audio experiences to the respective players. For example, in the case of a fighter pilot simulation game, a user operating game controller 26 would hear sounds unique to his aircraft and/or team. Similarly, a user operating game controller 28 would hear sounds unique to her aircraft and/or her team. Each player would not hear the audio provided to the other player, thereby enhancing the audio experience of the multimedia game, although in certain applications it may be desirable for both players to hear some common sounds. These common sounds may be supplied under the control or direction of CPU 10, or alternatively, may be provided using, a separate line, or using a sum or difference technique known in the Art.

Continuing to refer to FIG. 1, it will be noted that both headsets 29 and 32 are illustrated as being coupled to the game controllers 26 and 28, respectively, through a wire coupling. It will be appreciated by one skilled in the art that in the embodiment of FIG. 1, as well as in the other embodiments disclosed in the Specification, both the game controllers and headphones may be coupled to the game system in a wireless manner. For example, it is contemplated that the game controllers may communicate with the game system, and/or the headphones may receive audio signals, either from the game system or from the game controllers using, for example, infrared or RF transmission mediums.

Figure 2:
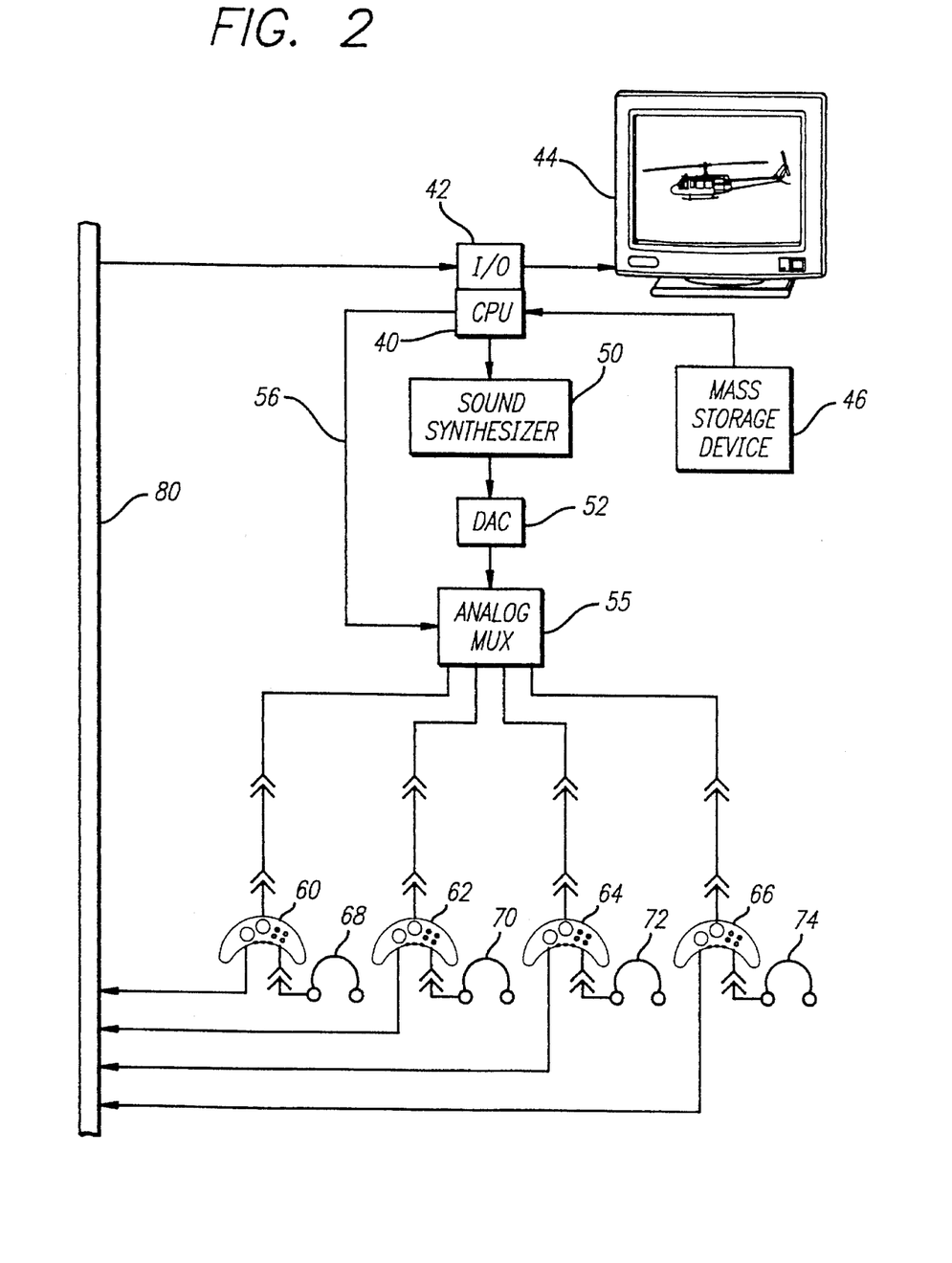
FIG. 2 is a block diagram of a second embodiment of the present invention in which stereo sound is provided to each game player under the control of a central processing unit.

Referring now to FIG. 2, therein is disclosed a block diagram illustrating a second embodiment of the present invention. As in the embodiment shown in FIG. 1, a CPU 40 is coupled to an I/O circuit 42. The I/O circuit 42 is coupled to a display 44 for displaying the visual output of an application program executed by the CPU 40. A mass storage device 46 stores the game program for execution by the CPU 40 as well as sound data to provide the audio experience for the application program. A sound synthesizer circuit 50 is coupled to the CPU 40 for generating a digital representation of the required sounds under the control of the CPU 40, and utilizing the sound data stored in the mass storage device 46.

As shown, a DAC 52 is coupled to the sound synthesizer circuit 50 for converting the digital output of the sound synthesizer circuit 50 into an analog output. An analog multiplexer 55 is coupled to the output of the DAC 52. In addition, a multiplex control line 56 is provided between the CPU 40 and the analog multiplexer 55. The analog multiplexer 55 is coupled to game controllers 60, 62, 64 and 66. Headphones 68, 70, 72 and 74 are coupled to the respective game controllers as shown in the figure. Although the analog multiplexer 55 is illustrated as a four-way multiplexer in FIG. 2, it will appreciated by one skilled in the art that the multiplexer 55 may have fewer or greater number of game controllers coupled to it as required by a particular game system or application. The game controllers illustrated in FIG. 2 are coupled to the CPU 40 over a game control bus 80 through the I/O circuit 42. It will be appreciated that the game control bus 80 may comprise an analog parallel bus or, with appropriate circuitry and supporting logic, a digital serial or parallel bus. In addition, although FIG. 2 illustrates the multiplex control line 56 coupled between the CPU 40 and the analog multiplexer 55, it will be noted by one skilled in the art that additional circuitry may be required (and is not shown) in order to provide control over the analog multiplexer 55 by the CPU 40. However, the additional support circuitry required to implement the present invention as illustrated in FIG. 2 is well-known, and therefore, not described in this Specification.

In operation, separate and independent audio experiences are provided to each of the users operating the game controllers 60, 62, 64 and 66 by multiplexing the audio output from the DAC 52. For example, audio to be directed to a user operating game controller 60 is provided by the CPU 40 to the sound synthesis circuit 50 and the DAC 52. The output of the DAC 52 is coupled to the analog multiplexer 55 which is selected by the CPU 40 to provide its output at the appropriate time to the game controller 60 and headphones 68.

Although not shown in the figure, it may be desirable depending on the speed of the audio output to buffer the output of the analog multiplexer 50, or sound synthesis circuit 52, to achieve proper timing and realism in game play. In addition, in certain applications, it may be desirable to group multiple players into teams which receive the same audio experience. For example, in the embodiment illustrated in FIG. 2 the game application may group players operating the game controllers 60 and 62 as a first team, and players operating the game controllers 64 and 66 as a second team. As such, the analog multiplexer 55 need only switch between two groups of players thereby reducing the speed requirements of the system. In game applications, such as for example a helicopter gun ship squadron battling a tank squadron, the players operating within each group of game controllers would hear only audio signals appropriate for their group. Thus, the players commanding the helicopter gun ships will hear only helicopter gun ship audio, and the tank players will hear only tank communications and other audio associated with the tank group. Of course, it will be understood that there may be instances where it is desirable to provide some common audio to all players. In such event, either a separate common line may be used between the multiplexer and the game controllers, or alternatively, the multiplexer may sequentially provide the common audio to each game controller.

Figure 3:
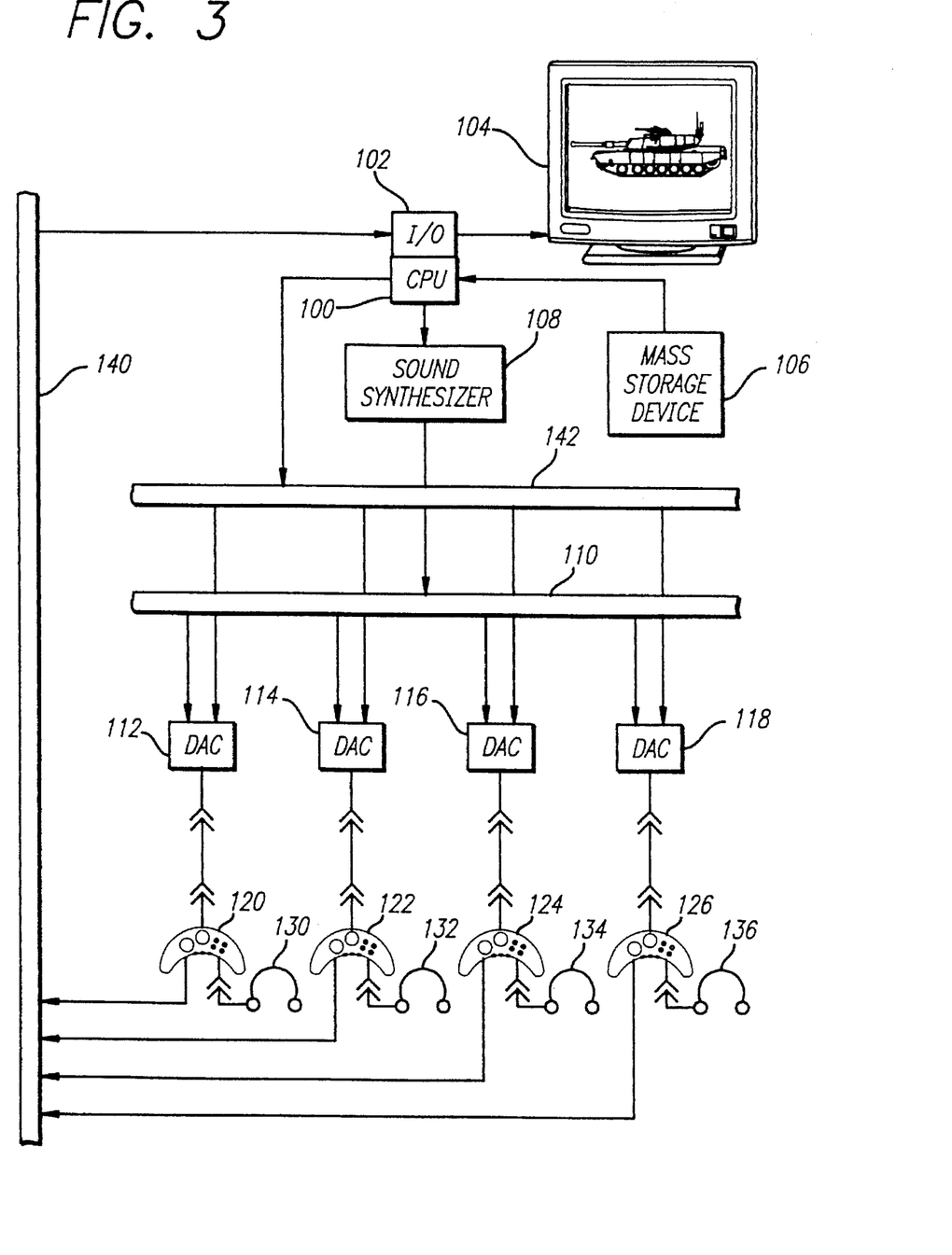
FIG. 3 is a block diagram illustrating a third embodiment of the present invention wherein multiple digital to audio converters (DACs) are coupled to an audio bus, and wherein each of the DACs are under the control of a central processing unit.

Referring now to FIG. 3, a block diagram is provided illustrating a third embodiment of the present invention. As in the embodiments of FIGS. 1 and 2, a CPU 100 is coupled to an I/O circuit 102. The I/O circuit 102 is coupled to a display 104 for displaying the application program executed by the CPU 100 under the control of software stored in, for example, a mass storage device 106. The mass storage device 106 further stores sound data required by the particular game program executed by the CPU 100.

As shown, a sound synthesizer circuit 108 is coupled to the CPU 100 for generating digital representations of sounds required by the game application using, for example, the audio data stored in the mass storage device 106. The sound synthesizer circuit 108 is coupled to an audio bus 110. DACs 112, 114, 116 and 118 are coupled to receive the output of the sound synthesizer circuit 108 over the audio bus 110. Although four DACs are illustrated in FIG. 3, it will appreciated that depending upon the particular game system and/or application program, any number of DACs may be coupled to sound bus 110.

As illustrated, game controllers 120, 122, 124 and 126 are coupled, respectively, to the DACs 112, 114, 116 and 118. Headphones 130, 132, 134 and 136 are coupled to the respective game controllers. A game control bus 140 is provided to couple signals originating from each of the game controllers to the CPU 100 through the I/O circuit 102. The game control bus 140 may comprise an analog parallel bus, or alternatively, with appropriate digital logic, a digital serial or parallel bus. As shown in FIG. 3, DACs 112, 114, 116 and 118 are each coupled to a DAC control bus 142. The CPU 100 is also coupled to each of the DACs over the DAC control bus 142.

In operation, CPU 100 executing the application program stored in the mass storage device 106 provides sound data to the sound synthesizer circuit 108. The output of the sound synthesizer circuit 108 is coupled to the audio bus 110. Each of the DACs 112, 114, 116 and 118 are selectively enabled by a control signal provided over the DAC control bus 142 from the CPU 100. Audio data directed to the user operating, for example, the game controller 120 is provided over the audio bus 110 by the sound synthesizer circuit 108. Substantially concurrent to the sound synthesizer circuit 108 providing audio destined for game controller 120 the CPU 100 provides an enable signal to the DAC 112 over the DAC control bus 142. Since only DAC 112 is enabled (DACs 114, 116 and 118 being disabled) audio data destined for game controller 120 is only received by game controller 120 and not the other game controllers coupled to the system. Similarly, audio data destined for any of the other game controllers illustrated in FIG. 2 is provided to the desired game controller through the selective enabling of the corresponding DAC by the CPU 100. Common audio data which is destined for all (or groups) of game controllers is provided by enabling all, or a selected set, of the DACs.

It will be appreciated by one skilled in the art that it may be desirable to buffer the output of the sound synthesizer circuit 108 to ease the timing requirements for the enabling and disabling of the DACs. It is contemplated that the buffering of the DACs may be accomplished at a much faster rate than the sound output requirements of the game controllers coupled to the system. In this manner, the audio output of each game controller would approach that of a real time system, such that the user does not perceive any undesirable delays in receiving his audio output, and each player will perceive simultaneous audio experiences despite the serial nature of the output of the sound synthesis circuit 108.

Figure 4:
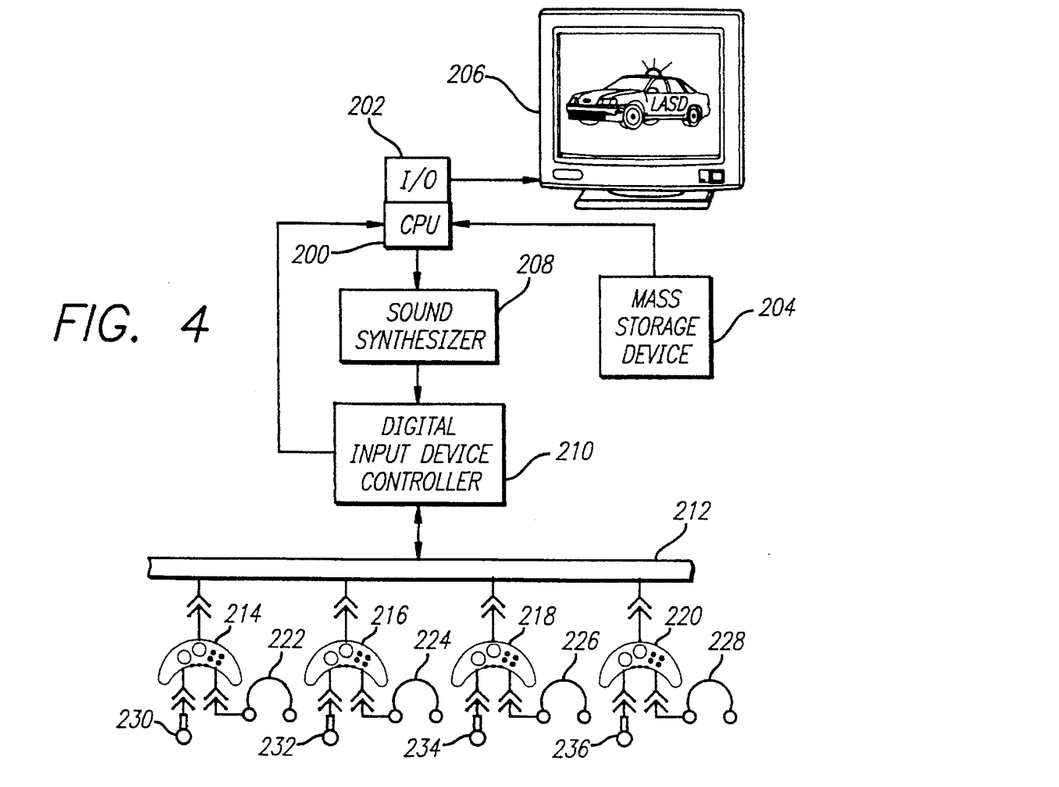
FIG. 4 illustrates a block diagram of a fourth embodiment of the present invention wherein each of the players' game controllers are coupled to a high speed digital bus.
Figure 5:
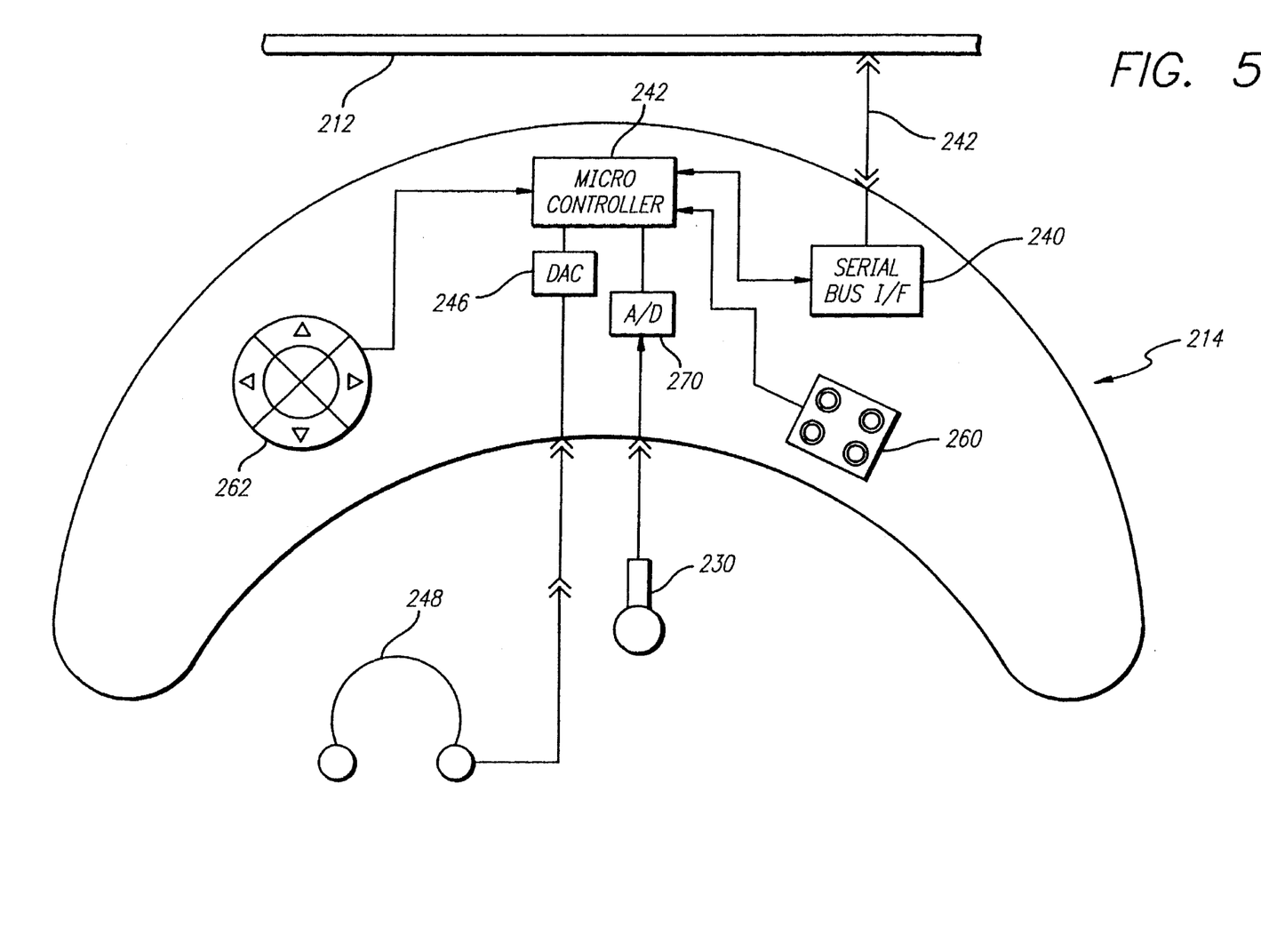
FIG. 5 is a block diagram of a game controller utilized by the present invention's fourth embodiment shown in FIG. 4.

Referring now to FIG. 4 in conjunction with FIG. 5, there is shown a fourth embodiment of the present invention. As in the embodiments illustrated in FIGS. 1 through 3, a CPU 200 is coupled to an I/O circuit 202 and to a mass storage device 204. The I/O circuit 202 is coupled to a display 206 for displaying the visual portion of an application program executed by the CPU 200 and stored in the mass storage device 204. Sound data representing the audio portion of the program is also stored in the mass storage device 204, as previously described with reference to the other embodiments.

A sound synthesizer circuit 208 is coupled to the CPU 200 for generating the required sound signals utilizing the sound data stored in the mass storage device 204.

A digital input device controller 210 is coupled to receive the digital audio output from the sound synthesizer circuit 208. In practice, it is contemplated that the digital input device controller may comprise hardware under the control of the CPU 200. The digital input device controller 210 is coupled to a digital bi-directional high speed bus 212. Game controllers 214, 216, 218 and 220 are also coupled to the high speed bus 212. As illustrated in FIG. 4 and as will be described more fully below, digital audio is coupled over the high speed bus 212 to the game controllers, and player commands are coupled through the digital input device controller 210 to the CPU 200. Headphones 222, 224, 226 and 228 are coupled to their respective game controllers to provide independent audio to each of the players. As will be appreciated, the embodiment illustrated in FIG. 4 is almost entirely digital. Selections made by players using the game controllers 214, 216, 218 and 220 are coupled over the high speed bus 212 to the digital input device controller 210 and the CPU 200. Similarly, digitized audio to be directed independently to each of the players is coupled over the high speed bus 212 and addressed to the desired game controller. It is contemplated that the high speed bus 212 may comprise the Apple Firewire® (IEEE P1394), the Intel® Universal Serial Bus, or other bus having similar high speed capabilities.

Also shown in FIG. 4 are optional microphones 230, 232, 234 and 236 coupled to each of the game controllers. The embodiment illustrated in FIG. 4 provides not only full stereo audio to each of the players, but also permits audio feedback from each of the players to the other players as may be desired in a particular game or other application.

In operation, a program executed by the CPU 200 utilizes sound data stored in the mass storage device 204 to generate unique independent sounds to each player as provided by the application. The digital input device controller 210 handles the two-way communication of data and sound between the game controllers 214, 216, 218 and 220. Illustrated in FIG. 5 is a representative game controller 214 which includes a serial bus interface circuit 240 coupled over line 242 to the high speed bus 212. A microcontroller 242 is coupled to the serial bus interface 240. The microcontroller 242 may comprise a general purpose microprocessor, or alternatively, may comprise a custom microcontroller. A DAC 246 is coupled to the microcontroller 242 and to headphones 248. Sound data is provided from the sound synthesizer circuit 208 through the digital input device controller 210 and coupled over the high speed bus 212 to the serial bus interface 240. The microcontroller 242 further couples this digitized audio to the DAC 246 which converts the digitized audio into analog signals. A player utilizing the game controller 214 will then hear independent audio intended for, and directed to, that player using the headphones 248.

The game controller 214 includes various input devices such as push button switches 260 and four-way rocker switches 262. A player operating the game controller 214 provides game input commands to the CPU 200 through the use of switches 260 and 262. Signals generated by the switches 260 and 262 are coupled to the microcontroller 242 and are ultimately coupled through the serial bus interface 240 to the high speed bus 212. The digital input device controller 210 receives these input command signals and couples them to the CPU 200. Similarly, for audio input at the player level, microphone 230 is coupled to an analog to digital (A/D) converter 270, which is in turn coupled to the microcontroller 242. Audio input may thereby be provided to other players, or to the CPU 200, depending on the game application.

Thus, it will be appreciated that the embodiment illustrated in FIGS. 4 and 5 is almost entirely digital in nature and provides separate independent audio to each of the players operating the various game controllers. Since each game controller is independently addressable, data packets comprising digitized audio may be directed independently to the game controllers. Input command signals may be coupled back to the CPU 200 by the player using switches 260 and 262, such that these desired input command signals are coupled in a packetized form over the high speed bus 212 for receipt by the CPU 200. Digital audio signals destined for a particular game controller and player are encapsulated by the digital input device controller 210 in accordance with the protocol of the bus 212. The packet is received by the destination game controller and decapsulated to recover the digital audio signals. The digital audio signals are then coupled to the DAC which provides analog audio signals to the player's headphones.

Accordingly, the embodiment illustrated in FIG. 4 permits very high levels of performance and flexibility. For example, individuals and groups of players may selectively receive communications between one another depending upon the game application. In the context of a tank battle game wherein different teams are fighting against one another, those team members may receive and transmit secure communications between one another through the use of headphones (for example, headphone 248) and the microphones (for example, microphone 230) coupled to the game controllers. In addition, as game and computer systems become more sophisticated, it is contemplated that each of the players may communicate through voice recognition software directly with the CPU 200, and thereby achieve a level of dialog and interaction with the game application program.

As described in this Specification, the present invention may be implemented in one of a variety of embodiments depending upon the level of sophistication and technical performance required. Each of the embodiments of the present invention provide separate and independent audio to players of a multimedia game executed by either a dedicated game player, or alternatively, a personal or other digital computer. It will further be appreciated that the embodiments illustrated herein may be networked through local area networks (LAN), wide area networks (WAN), telephone, optical fiber, two-way cable, and/or satellite links with other game players and/or computers. It is contemplated that the networking of systems employing the teachings of the present invention will permit independent and separate audio experiences to each of the players disposed on the network. Although the present invention has been described with reference to a few exemplary FIGS. 1 through 5, it will be apparent that many alternatives, modifications and variations may be made in light of the foregoing description.

I claim:

1. A computer game apparatus for providing separate and independent audio to a first and a second user, comprising:

storage means for storing sound data;

processor means operating under the control of a program and coupled to said storage means, for selecting and retrieving first sound data for said first user and second sound data for said second user;

sound synthesizer means coupled to receive said first and second sound data and converting said sound data into first and second digital audio signals, respectively;

digital to audio converter (DAC) means for receiving said first and second digital audio signals from said sound synthesizer means and converting said first and second digital audio signals into corresponding first and second analog audio signals;

routing means coupled to receive said first and second analog audio signals and selectively providing said first analog audio signals to said first user and said second analog audio signals to said second user;

a listening device coupled to said routing means and provided to said first and second users to convert said first and selectively second analog audio signals to sound waves such that said first user hears said first analog audio signals and said second user hears said second analog audio signals.

2. The apparatus as defined by claim 1 wherein said DAC means comprises a single digital to audio converter having a stereo output comprising first and second output channels, said first analog audio signals provided to said routing means on said first output channel and said second analog audio signals provided to said routing means on said second output channel.

3. The apparatus as defined by claim 1 wherein said routing means comprises an electrical coupling between said DAC means and said listening devices.

4. The apparatus as defined by claim 1 wherein said routing means comprises a wireless coupling between said DAC means and said listening devices.

5. The apparatus as defined by claim 1 wherein said routing means comprises a multiplexer, said multiplexer controlled by said processor means to selectively couple said first analog audio signals to said listening device of said first user and said second analog audio signals to said listening device of said second user.

6. The apparatus as defined by claim 1 wherein said DAC means comprises a first digital to audio converter coupled to receive said first digital audio signals and a second digital to audio converter coupled to receive said second digital audio signals from said sound synthesizer means.

7. The apparatus as defined by claim 6 wherein said first and second digital to audio converters are selectively enabled by said processor means, such that said first digital to audio converter is enabled and said second digital to audio converter is disabled when said sound synthesizer means outputs said first digital audio signals, and said first digital to audio converter is disabled and said second digital to audio converter is enabled when said sound synthesizer means outputs said second digital audio signals.

8. A computer game apparatus for providing separate and independent audio to a first and a second user, comprising:

storage means for storing sound data;

processor means operating under the control of a program and coupled to said storage means, for selecting and retrieving first sound data for said first user and second sound data for said second user;

sound synthesizer means coupled to receive said first and said second sound data and converting said sound data into first and second digital audio signals, respectively;

controller means coupled to said sound synthesizer to receive said first and second digital audio signals, said controller means further coupled to a bus to provide said first digital signal to a first user and said second digital signal to a second user;

a first and a second receiving device coupled to said bus for receiving said first and second digital audio signals, respectively;

conversion means coupled to each of said receiving devices for converting said received first and second digital audio signals into corresponding first and second analog audio signals;

a listening device coupled to each of said conversion means for converting said first and second analog audio signals to sound waves such that said first user hears said first analog audio signals and said second user hears said second analog audio signals.

9. The apparatus as defined by claim 8 wherein said first and second receiving devices comprise game controllers.

10. The apparatus as defined by claim 9 wherein said conversion means includes digital to audio converter (DAC) means for converting said first and second digital audio signals into said corresponding first and second analog audio signals.

11. The apparatus as defined by claim 10 wherein each of said game controllers includes input signal means for receiving input signals from said users of said game controller.

12. The apparatus as defined by claim 11 wherein each of said game controllers includes microcontroller means coupled to said conversion means and to said input signal means.

13. The apparatus as defined by claim 12 wherein said bus comprises a serial bus and each of said game controllers includes a serial bus interface circuit for receiving said first and second digital audio signals over said bus, and sending said input signals to said processor means over said bus.

14. The apparatus as defined by claim 13 wherein each of said game controllers includes audio input means for receiving audio inputs from said users of said game controllers.

15. The apparatus as defined by claim 14 wherein said audio inputs are coupled to said CPU to be selectively coupled back to said game controllers to provide real time player generated sounds to said users.

* * * * *